US011996115B2

(12) United States Patent
Sendoda

(10) Patent No.: US 11,996,115 B2
(45) Date of Patent: May 28, 2024

(54) SOUND PROCESSING METHOD

(71) Applicant: NEC Corporation, Tokyo (JP)

(72) Inventor: Mitsuru Sendoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

(21) Appl. No.: 17/435,761

(22) PCT Filed: Dec. 18, 2019

(86) PCT No.: PCT/JP2019/049599
§ 371 (c)(1),
(2) Date: Sep. 2, 2021

(87) PCT Pub. No.: WO2020/183845
PCT Pub. Date: Sep. 17, 2020

(65) Prior Publication Data

US 2022/0051687 A1 Feb. 17, 2022

(30) Foreign Application Priority Data

Mar. 8, 2019 (JP) ................................ 2019-042431

(51) Int. Cl.
*G10L 25/24* (2013.01)
*G10L 21/0208* (2013.01)
*G10L 25/18* (2013.01)
*G10L 25/51* (2013.01)

(52) U.S. Cl.
CPC .............. *G10L 25/24* (2013.01); *G10L 25/51* (2013.01)

(58) Field of Classification Search
CPC ..... G10L 25/24; G10L 25/51; G10L 21/0208; G10L 25/18
USPC ........................................ 381/56, 58, 73, 77
See application file for complete search history.

(56) References Cited

U.S. PATENT DOCUMENTS

2012/0010835 A1 1/2012 Soensteroed et al.
2013/0246064 A1* 9/2013 Wasserblat .............. G10L 25/78 704/244
2014/0278372 A1 9/2014 Nakadai et al.
2018/0077508 A1 3/2018 Namba et al.
2018/0295463 A1 10/2018 Eronen et al.
2019/0042881 A1* 2/2019 Lopatka .................. G10L 25/24
2020/0143819 A1 5/2020 Delcroix et al.

FOREIGN PATENT DOCUMENTS

JP 2006-202225 A 8/2006
JP 2008-145988 A 6/2008
JP 2008-176155 A 7/2008
JP 2009-065424 A 3/2009

(Continued)

OTHER PUBLICATIONS

Japanese Office Action for JP Application No. 2021-505527 dated Jun. 7, 2022 with English Translation.

(Continued)

*Primary Examiner* — Thjuan K Addy

(57) ABSTRACT

A sound processing apparatus includes a feature value extractor configured to perform a Fourier transform and then a cepstral analysis of a sound signal and to extract, as feature values of the sound signal, values including frequency components obtained by the Fourier transform of the sound signal and a value based on a result obtained by the cepstral analysis of the sound signal.

17 Claims, 7 Drawing Sheets

(56) References Cited

FOREIGN PATENT DOCUMENTS

| | | | |
|---|---|---|---|
| JP | 2011-517799 | A | 6/2011 |
| JP | 2014-178886 | A | 9/2014 |
| JP | 2015-057630 | A | 3/2015 |
| JP | 2016-099507 | A | 5/2016 |
| JP | 2016-180791 | A | 10/2016 |
| WO | 2019/017403 | A1 | 1/2019 |

OTHER PUBLICATIONS

International Search Report for PCT Application No. PCT/JP2019/049599, dated Mar. 10, 2020.

* cited by examiner

SOUND PROCESSING METHOD

This application is a National Stage Entry of PCT/JP2019/049599 filed on Dec. 18, 2019, which claims priority from Japanese Patent Application 2019-042431 filed on Mar. 8, 2019, the contents of all of which are incorporated herein by reference, in their entirety.

TECHNICAL FIELD

The present invention relates to a sound processing method, sound processing apparatus, and program.

BACKGROUND ART

There is a desire to estimate abnormality or detailed state of an apparatus in use through a sound in a factory, home, a common commercial facility, or the like. A technology is known that detects a particular sound from the general environment, in which various sounds are usually mixed together, in order to detect the state through a sound. A noise cancellation technique is also known that identifies and reduces (eliminates) ambient noise included in an input signal. There are also known methods of identifying a particular sound by comparing an input signal from which ambient noise has been eliminated using the noise cancellation technology, with a previously learned signal pattern (for example, see Patent Document 1). There is also known a method of identifying an input signal having large sound pressure variations in the time domain, as a sudden sound (hereafter referred to as an "impulse sound"). There are also known methods of identifying, as an impulse sound, an input signal whose ratio between the sound pressure energy of a low-frequency range and the sound pressure energy of a high-frequency range in the frequency range is equal to or greater than a predetermined threshold (for example, see Patent Document 2).

Among technologies that mainly recognize human speeches are methods described in Patent Documents 3 and 4. Patent Documents 3 and 4 include recognizing a sound by previously storing a sound model and making a comparison between sound feature values extracted from a sound signal and the sound model. The sound feature values are mel-frequency cepstral coefficients (MFCC) and are typically the n-th order cepstral coefficients obtained by eliminating the zero-th-order component, that is, the direct-current component, as described in Patent Document 4.

Patent Document 1: Japanese Unexamined Patent Application Publication No. 2009-65424

Patent Document 2: Japanese Unexamined Patent Application Publication (Translation of PCT Application) No. 2011-517799

Patent Document 3: Japanese Unexamined Patent Application Publication No. 2014-178886

Patent Document 4: Japanese Unexamined Patent Application Publication No. 2008-176155

SUMMARY OF INVENTION

However, an impulse sound, such as a sound that occurs when a ceiling light or a home appliance is switched on or a sound that occurs when a door is closed, shows approximately flat frequency characteristics in a certain range and therefore features thereof are difficult to grasp. For this reason, even if the technologies described in the above Patent Documents are used, the difficulty in grasping the features disadvantageously makes it difficult to determine from what the impulse sound is occurring under what situation and thus to identify the sound source.

Accordingly, an object of the present invention is to provide a sound processing method, sound processing apparatus, and program that are able to resolve the difficulty in recognizing an impulse sound.

A sound processing method according to an aspect of the present invention includes performing a Fourier transform and then a cepstral analysis of a sound signal and extracting, as feature values of the sound signal, values including frequency components obtained by the Fourier transform of the sound signal and a value based on a result obtained by the cepstral analysis of the sound signal.

A sound processing apparatus according to another aspect of the present invention includes a feature value extractor configured to perform a Fourier transform and then a cepstral analysis of a sound signal and to extract, as feature values of the sound signal, values including frequency components obtained by the Fourier transform of the sound signal and a value based on a result obtained by the cepstral analysis of the sound signal.

A program according to yet another aspect of the present invention is a program for implementing, in an information processing apparatus, a feature value extractor configured to perform a Fourier transform and then a cepstral analysis of a sound signal and to extract, as feature values of the sound signal, values including frequency components obtained by the Fourier transform of the sound signal and a value based on a result obtained by the cepstral analysis of the sound signal.

According to the present invention thus configured, an impulse sound is easily recognized.

EXAMPLE EMBODIMENTS

First Example Embodiment

Figure 1:
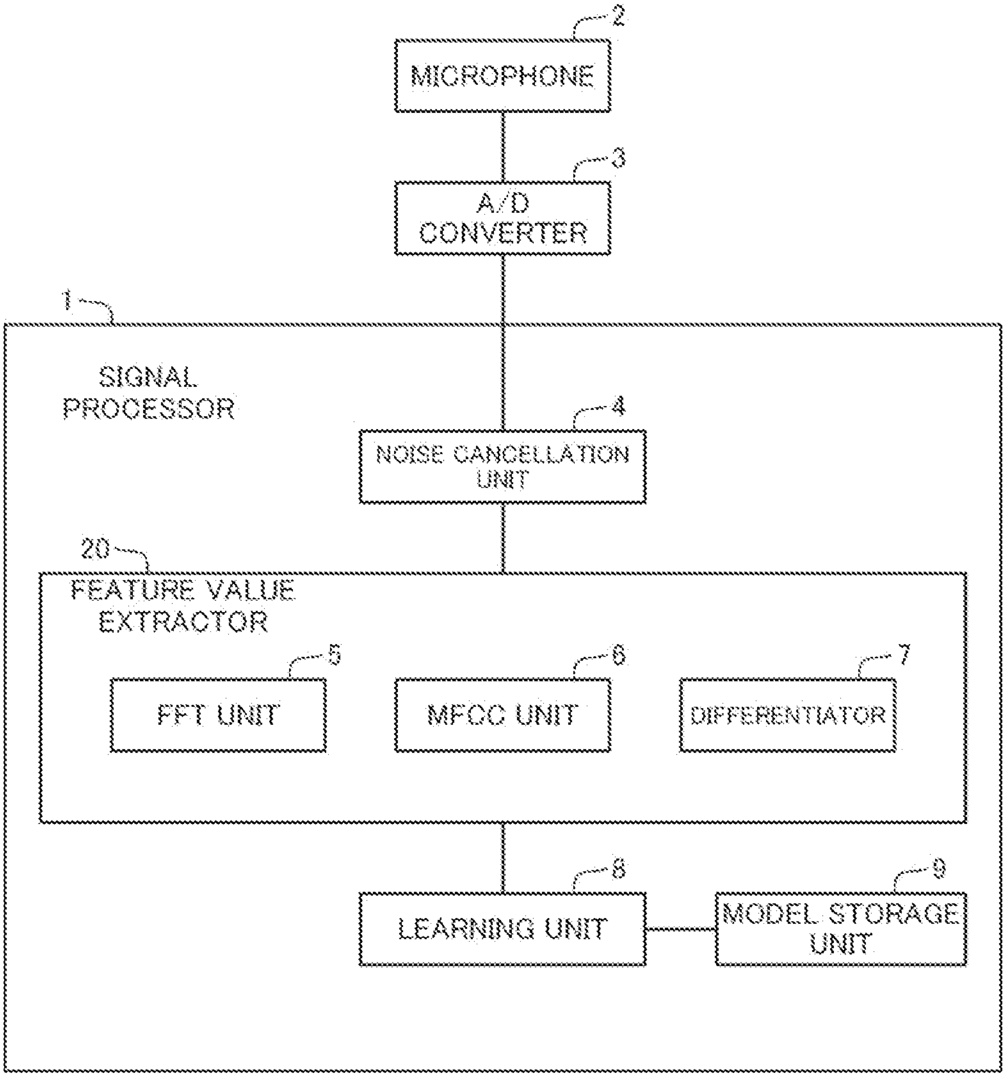
FIG. 1 is a block diagram showing a configuration of a sound processing system according to a first example embodiment of the present invention.
Figure 2:
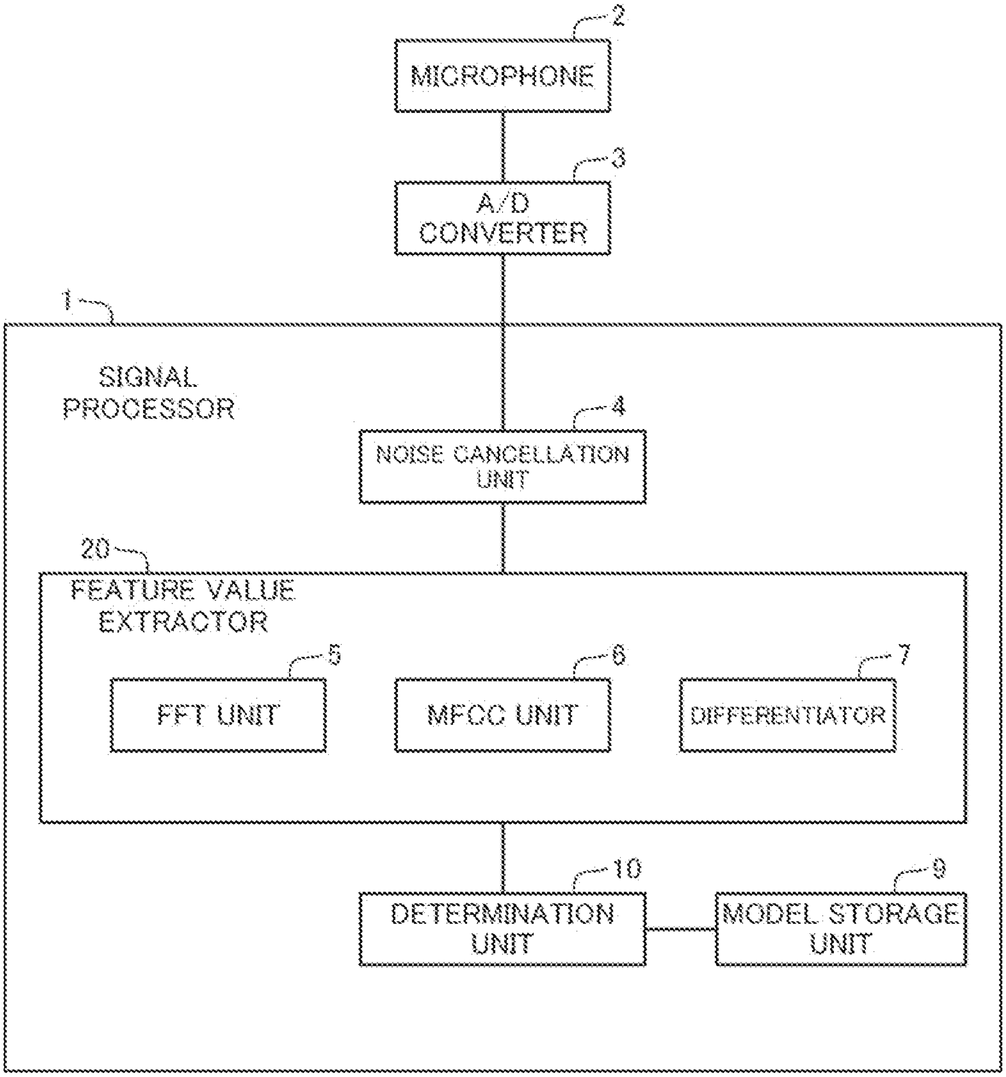
FIG. 2 is a block diagram showing a configuration of the sound processing system according to the first example embodiment of the present invention.
Figure 3:
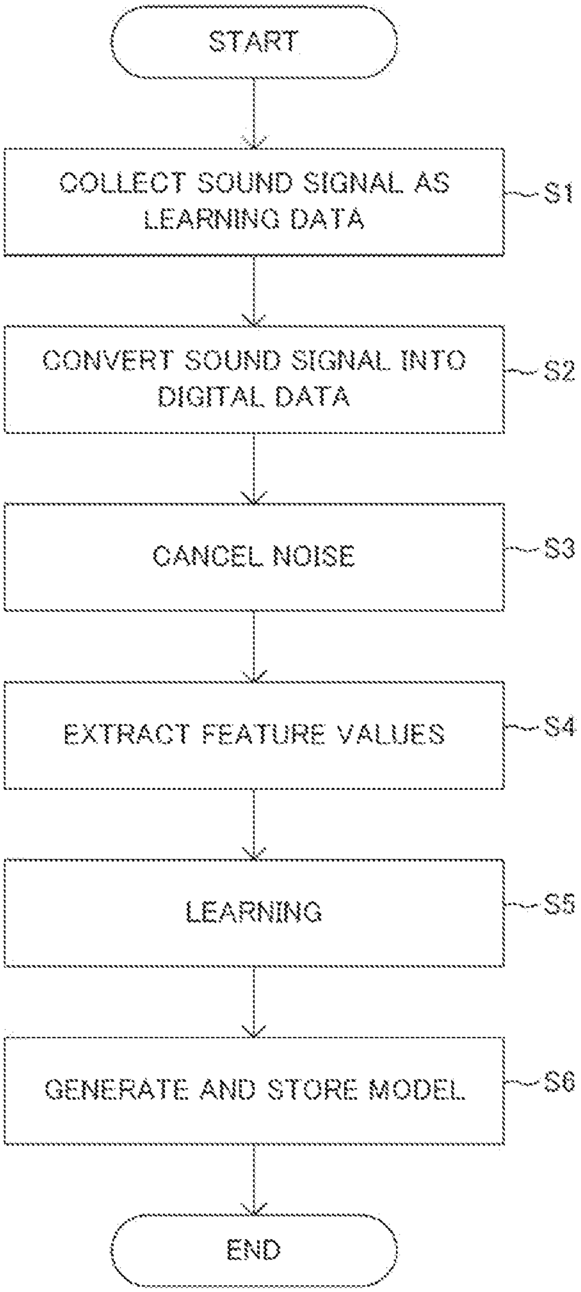
FIG. 3 is a flowchart showing an operation of the sound processing system disclosed in FIG. 1.
Figure 4:
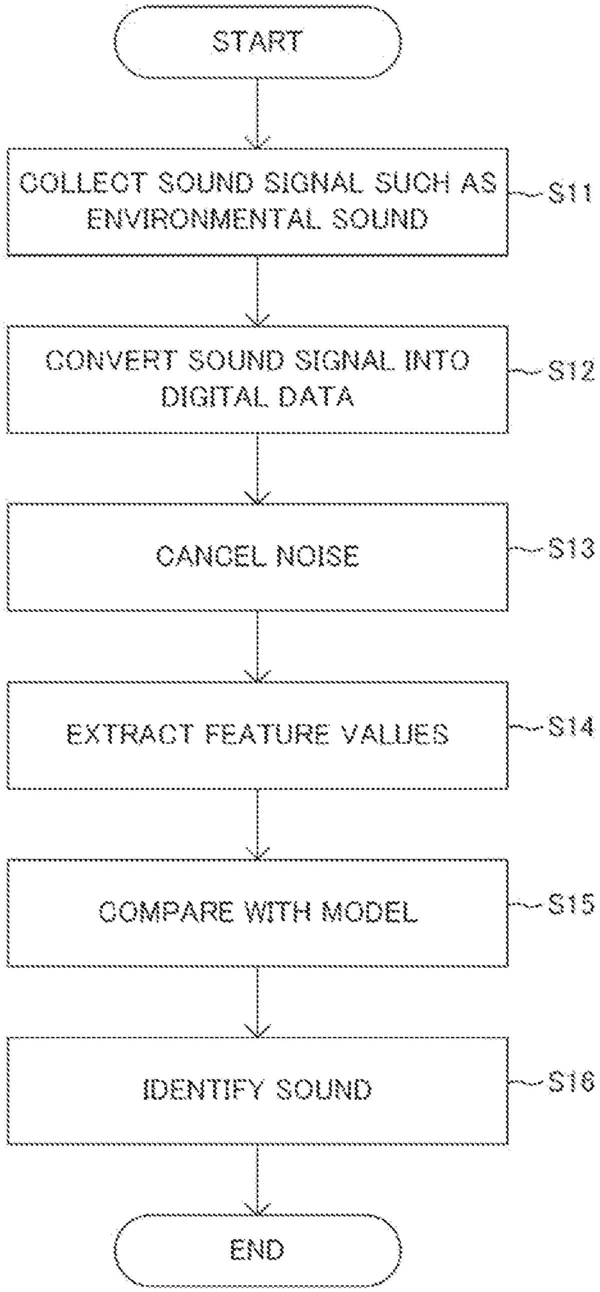
FIG. 4 is a flowchart showing an operation of the sound processing system disclosed in FIG. 2.

A first example embodiment of the present invention will be described with reference to FIGS. 1 to 4. FIGS. 1 and 2 are diagrams showing configurations of sound processing systems, and FIGS. 3 and 4 are diagrams showing operations of the sound processing systems.

The present invention consists of sound processing systems as shown in FIGS. 1 and 2. As will be described later, FIG. 1 shows a configuration of a sound processing system including elements for performing a learning phase of learning features of an acquired sound signal, and FIG. 2 shows a configuration of a sound processing system including elements for performing a detection phase of detecting the sound source of the sound signal. The sound processing systems shown in FIGS. 1 and 2 may be an integrated apparatus, or may consist of different apparatuses.

First, referring to FIG. 1, the elements of the sound processing system for performing the learning phase will be described. As shown in FIG. 1, the sound processing system includes a microphone 2, which is a converter for converting a sound into an electric sound signal, and an A/D converter 3 that converts the analog sound signal into digital data. That is, the sound signal obtained by the microphone 2 becomes digital data, which is signal-processable, numerical data. The digital data obtained by converting the sound signal obtained by the microphone 2 of the sound processing system for performing the learning phase is used as learning data.

The sound processing system also includes a signal processor 1 that receives and processes the sound data, which is digital data. The signal processor 1 consists of one or more information processing apparatuses each including an arithmetic logic unit and a storage unit. The signal processor 1 includes a noise cancellation unit 4, a feature value extractor 20, and a learning unit 8. These elements are implemented when the arithmetic logic unit executes a program. The storage unit(s) of the signal processor 1 includes a model storage unit 8. The respective elements will be described in detail below.

The noise cancellation unit 4 analyzes the sound data and eliminates noise (stationary noise: the sound of an air-conditioner indoors, the sound of wind outdoors, etc.) included in the sound data. The noise cancellation unit 4 then transmits the noise-eliminated sound data to the feature value extractor 20.

The feature value extractor 20 includes mathematical functional blocks for extracting features of the numerical sound data. The mathematical functional blocks extract the features of the sound data by converting numerical values of the sound data in accordance with the functions thereof. Specifically, as shown in FIG. 1, the feature value extractor 20 includes three mathematical functional blocks, that is, an FFT unit 5 (fast-Fourier-transform unit), an MFCC unit 6 (mel-frequency cepstral coefficient analyzer), and a differentiator 7.

The FFT unit 5 includes, in feature values of the sound data, frequency components of the sound data obtained by performing a fast Fourier transform of the sound data. The MFCC unit 6 includes, in feature values of the sound data, the zero-th-order component of a result obtained by performing a mel-frequency cepstral coefficient analysis of the sound data. The differentiator 7 calculates the differential component of the result obtained by the mel-frequency cepstral coefficient analysis of the sound data by the MFCC unit 6 and includes the differential component in feature values of the sound data. Thus, the feature value extractor 20 extracts, as the feature values of the sound data, values including the frequency components obtained by the fast Fourier transform of the sound data, the zero-th-order component of the result obtained by the mel-frequency cepstral coefficient analysis of the sound data, and the differential component obtained by differentiating the result of the mel-frequency cepstral coefficient analysis of the sound data. That is, with respect to the sound data, the feature value extractor 20 extracts sound pressure variations in the time domain using the zero-th-order component of MFCC, extracts time variations not dependent on the volume using the differential component of MFCC, and extracts the frequency components of the impulse by FFT, and uses the sound pressure variations and the like as the feature values of the sound data. For example, the feature value extractor 20 expresses the values extracted from the mathematical functional blocks as a set of numerical sequences in a time-series manner and uses the values as feature values.

The feature values of the sound data used in the present invention need not necessarily include the above values. For example, the feature values of the sound data may be values including frequency components obtained by a Fourier transform of the sound data and a value based on a result obtained by a cepstral analysis of the sound data, or values including the frequency components obtained by the Fourier transform of the sound data and the zero-th-order component of the result obtained by the cepstral analysis of the sound data. A cepstral analysis performed to detect a feature value of the sound data need not necessarily be a mel-frequency cepstral analysis.

The learning unit 8 generates a model by machine-learning the feature values of the sound data extracted by the feature value extractor 20, which are learning data. For example, the learning unit 8 receives input of teacher data (particular information) indicating the sound source (the sound source itself or the state of the sound source) of the sound data along with the feature values of the sound data and generates a model by learning the relationship between the sound data and teacher data. The learning unit 8 then stores the generated model in the model storage unit 9. Note that the learning unit 8 need not necessarily use the above method to learn from the feature values of the sound data and may use any method. For example, the learning unit 8 may learn previously classified sound data such that the sound data can be identified based on the feature values thereof.

Next, referring to FIG. 2, the elements of the sound processing system for performing the detection phase will be described. As shown in FIG. 2, the sound processing system includes approximately the same elements as those in FIG. 1, and the signal processor 1 includes a determination unit 10 in place of the learning unit 8. Note that the signal processor 1 of the sound processing system may include the determination unit 10 in addition to the elements in FIG. 1.

First, the model storage unit 9 is storing the model generated by learning the feature values of the sound data as learning data in the learning phase as described above. The microphone 2 acquires a sound signal to be detected whose sound source has not been identified, such as environmental sound, and the A/D converter 3 converts this analog sound signal into digital sound data.

The signal processor 1 receives the sound data to be detected, eliminates noise at the noise cancellation unit 4, and extracts feature values of the sound data at the feature value extractor 20. At this time, the feature value extractor 20 extracts the feature values of the sound data to be detected at the three mathematical functional blocks, that is, the FFT unit 5, MFCC unit 6, and differentiator 7 in a manner similar to that in which the feature values are extracted in the learning phase. Specifically, the feature value extractor 20 extracts, as the feature values of the sound data, values including frequency components obtained by a fast Fourier transform of the sound data, the zero-th-order component of a result obtained by a mel-frequency cepstral coefficient analysis of the sound data, and the differential component obtained by differentiating the result obtained by the mel-frequency cepstral coefficient analysis of the sound data. Note that the feature values of the sound data extracted in the detection phase need not necessarily include the above values and may include values similar to those extracted in the learning phase.

The determination unit 10 makes a comparison between the feature values extracted from the sound data by the feature value extractor 20 and the model stored in the model storage unit 9 and identifies the sound source of the sound data to be detected. For example, the determination unit 10 inputs the feature values extracted from the sound data to the model and identifies a sound source corresponding to a label representing an output value thereof, as the sound source of the sound data to be detected.

[Operation]

Next, an operation of the sound processing system thus configured will be described. First, referring to the flowchart of FIG. 3, the operation of the sound processing system that performs the learning phase will be described.

First, the sound processing system collects, from the microphone 2, a sound signal consisting of an impulse sound to be learned, whose sound source has been identified (step S1). Note that the sound signal to be learned need not be one collected by the microphone and may be a recorded sound signal. The sound processing system then converts the collected sound signal into digital sound data, which is signal-processable, numerical data, at the A/D converter 3 (step S2).

The sound processing system then inputs the sound data to the signal processor 1 and eliminates noise (stationary noise: the sound of an air-conditioner indoors, the sound of wind outdoors, etc.) included in the sound data at the noise cancellation unit 4 (step S3). The sound processing system then extracts the feature values of the sound data at the feature value extractor 20, that is, the FFT unit 5, MFCC unit 6, and differentiator 7 (step S4). In the present embodiment, the sound processing system extracts, as the feature values of the sound data, values including frequency components obtained by a fast Fourier transform of the sound data, the zero-th-order component of a result obtained by a mel-frequency cepstral coefficient analysis of the sound data, and the differential component obtained by differentiating the result obtained by the mel-frequency cepstral coefficient analysis of the sound data.

The sound processing system then generates a model by machine-learning the feature values of the sound data as learning data at the learning unit 8 (step S5). For example, the learning unit 8 receives input of teacher data indicating the sound source of the sound data along with the feature values of the sound data and generates a model by learning the relationship between the sound data and teacher data. The sound processing system then stores the model generated from the learning data in the model storage unit 9 (step S6).

Next, referring to the flowchart of FIG. 4, an operation of the sound processing system will be described that performs the detection phase of detecting the sound source of the impulse sound to be detected, such as environmental sound.

First, the sound processing system newly collects and detects a sound signal, such as environmental sound, from the microphone 2 (step S11). Note that the sound signal need not be one collected by the microphone and may be a recorded sound signal. The sound processing system then converts the collected sound signal into digital sound data, which is signal-processable, numerical data, at the A/D converter 3 (step S12).

The sound processing system then inputs the sound data to the signal processor 1 and eliminates noise (stationary noise: the sound of an air-conditioner indoors, the sound of wind outdoors, etc.) included in the sound data at the noise cancellation unit 4 (step S13). The sound processing system then extracts feature values of the sound data at the feature value extractor 20, that is, the FFT unit 5, MFCC unit 6, and differentiator 7 (step S14). In the present embodiment, the sound processing system extracts, as the feature values of the sound data, values including frequency components obtained by a fast Fourier transform of the sound data, the zero-th-order component of a result obtained by a mel-frequency cepstral coefficient analysis of the sound data, and the differential component obtained by differentiating the result obtained by the mel-frequency cepstral coefficient analysis of the sound data. These steps are approximately the same as those in the learning phase.

The sound processing system then, at the determination unit 10, makes a comparison between the feature values extracted from the sound data and the model stored in the model storage unit 9 (step S15) and identifies the sound source of the sound data to be detected (step S16). For example, the determination unit 10 inputs the feature values extracted from the sound data to the model and identifies a sound source corresponding to a label, which is output values thereof, as the sound source of the sound data to be detected.

As described above, with respect to the sound data, the present invention extracts sound pressure variations in the time domain using the zero-th-order component of MFCC, extracts time variations not dependent on the volume using the differential component of MFCC, and extracts the frequency components of the impulse by FFT, and uses the sound pressure variations and the like as feature values of the sound data. By learning the sound data having these feature values, the present invention is able to identify the type of the impulse sound that is included in environmental sound or the like and whose sound source is unknown.

Second Example Embodiment

Figure 5:
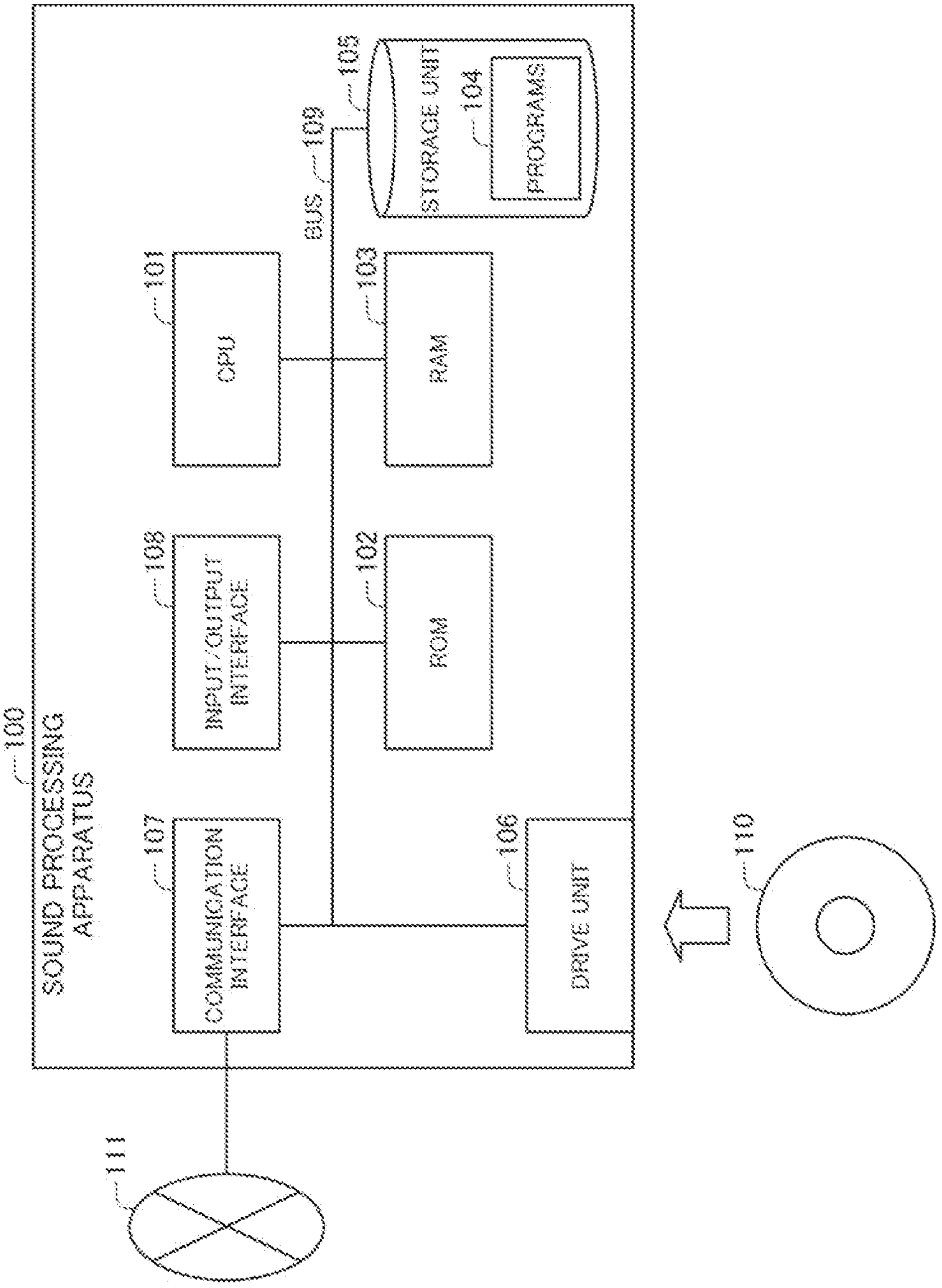
FIG. 5 is a block diagram showing a hardware configuration of a sound processing apparatus according to a second example embodiment of the present invention.
Figure 6:
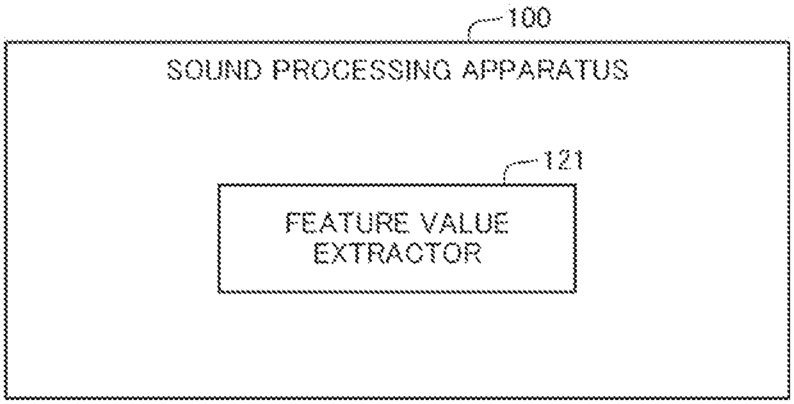
FIG. 6 is a block diagram showing a configuration of the sound processing apparatus according to the second example embodiment of the present invention.
Figure 7:
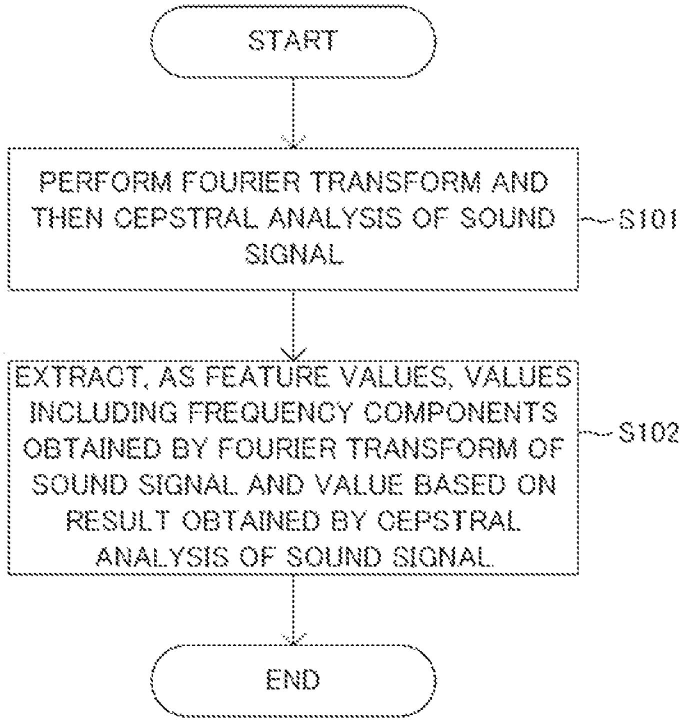
FIG. 7 is a flowchart showing an operation of the sound processing apparatus according to the second example embodiment of the present invention.

Next, a second embodiment of the present invention will be described with reference to FIGS. 5 to 7. FIGS. 5 and 6 are block diagrams showing a configuration of a sound processing apparatus according to the second embodiment, and FIG. 7 is a flowchart showing an operation of the sound processing apparatus. In the present embodiment, the configurations of the sound processing apparatus and the method performed by the sound processing apparatus described in the first example embodiment are outlined.

First, referring to FIG. 5, a hardware configuration of a sound processing apparatus 100 according to the present embodiment will be described. The sound processing apparatus 100 consists of a typical information processing apparatus and includes, for example, the following hardware components:

- a CPU (central processing unit) 101 (arithmetic logic unit);
- a ROM (read only memory) 102 (storage unit);
- a RAM (random access memory) 103 (storage unit);
- programs 104 loaded into the RAM 103;
- a storage unit 105 storing the programs 104;
- a drive unit 106 that writes and reads to and from a storage medium 110 outside the information processing apparatus;
- a communication interface 107 that connects with a communication network 111 outside the information processing apparatus;

an input/output interface 108 through which data is outputted and inputted; and a bus 109 through which the components are connected to each other.

When the CPU 101 acquires and executes the programs 104, a feature value extractor 121 shown in FIG. 6 is implemented in the sound processing apparatus 100. For example, the programs 104 are previously stored in the storage unit 105 or ROM 102, and the CPU 101 loads and executes them into the RAM 103 when necessary. The programs 104 may be provided to the CPU 101 through the communication network 111. Also, the programs 104 may be previously stored in the storage medium 110, and the drive unit 106 may read them therefrom and provide them to the CPU 101. Note that the feature value extractor 121 may be implemented by an electronic circuit.

The hardware configuration of the information processing apparatus serving as the sound processing apparatus 100 shown in FIG. 5 is only illustrative and not limiting. For example, the information processing apparatus does not have to include one or some of the above components, such as the drive unit 106.

The sound processing apparatus 100 performs the sound processing method shown in the flowchart of FIG. 7 using the functions of the feature value extractor 121 implemented by the programs as described above.

As shown in FIG. 7, the sound processing apparatus 100:

performs a Fourier transform and then a cepstral analysis of the sound signal (step S101); and extracts, as the feature values of the sound signal, values including frequency components obtained by the Fourier transform of the sound signal and a value based on a result obtained by the cepstral analysis of the sound signal (step S102).

As described above, the present invention extracts, as the feature values of the sound signal, the values including the frequency components obtained by the Fourier transform of the sound signal and the value based on the result obtained by the cepstral analysis of the sound signal. Thus, the present invention is able to properly extract the features of the impulse sound based on the values. As a result, the impulse sound is easily recognized.

<Supplementary Notes>

Some or all of the embodiments can be described as in Supplementary Notes below. While the configurations of the sound processing method, sound processing apparatus, and program according to the present invention are outlined below, the present invention is not limited thereto.

(Supplementary Note 1)

A sound processing method comprising:

performing a Fourier transform and then a cepstral analysis of a sound signal; and extracting, as feature values of the sound signal, values including frequency components obtained by the Fourier transform of the sound signal and a value based on a result obtained by the cepstral analysis of the sound signal.

(Supplementary Note 2)

The sound processing method according to Supplementary Note 1, wherein the extracting comprises extracting, as the feature values of the sound signal, values including the frequency components obtained by the Fourier transform of the sound signal and the zero-th-order component of the result obtained by the cepstral analysis of the sound signal.

(Supplementary Note 3)

The sound processing method according to Supplementary Note 2, wherein the extracting comprises extracting, as the feature values of the sound signal, values including the frequency components obtained by the Fourier transform of the sound signal, the zero-th-order component of the result obtained by the cepstral analysis of the sound signal, and a differential component of the result obtained by the cepstral analysis of the sound signal.

(Supplementary Note 4)

The sound processing method according to any of Supplementary Notes 1 to 3, wherein the cepstral analysis is a mel-frequency cepstral coefficient analysis.

(Supplementary Note 5)

The sound processing method according to any of Supplementary Notes 1 to 4, wherein a model is generated by learning the sound signal based on the feature values extracted from the sound signal and identification information identifying the sound signal.

(Supplementary Note 6)

The sound processing method according to Supplementary Note 5, wherein the feature values are extracted from the newly detected sound signal, and the identification information corresponding to the feature values extracted from the new sound signal is identified using the model.

(Supplementary Note 7)

The sound processing method according to any of Supplementary Notes 1 to 4, wherein the feature values are extracted from the newly detected sound signal, and the sound signal is identified based on the feature values.

(Supplementary Note 8)

A sound processing apparatus comprising a feature value extractor configured to perform a Fourier transform and then a cepstral analysis of a sound signal and to extract, as feature values of the sound signal, values including frequency components obtained by the Fourier transform of the sound signal and a value based on a result obtained by the cepstral analysis of the sound signal.

(Supplementary Note 8.1)

The sound processing apparatus according to Supplementary Note 8, wherein the feature value extractor extracts, as the feature values of the sound signal, values including the frequency components obtained by the Fourier transform of the sound signal and the zero-th-order component of the result obtained by the cepstral analysis of the sound signal.

(Supplementary Note 8.2)

The sound processing apparatus according to Supplementary Note 8.1, wherein the feature value extractor extracts, as the feature values of the sound signal, values including the frequency components obtained by the Fourier transform of the sound signal, the zero-th-order component of the result obtained by the cepstral analysis of the sound signal, and a differential component of the result obtained by the cepstral analysis of the sound signal.

(Supplementary Note 8.3)

The sound processing apparatus according to Supplementary Note 8.2, wherein the cepstral-analysis is a mel-frequency cepstral coefficient analysis.

(Supplementary Note 9)

The sound processing apparatus according to any of Supplementary Notes 8 to 8.3, comprising a learning unit configured to generate a model by learning the sound signal based on the feature values extracted from the sound signal and identification information identifying the sound signal.

(Supplementary Note 9.1)

The sound processing apparatus according to Supplementary Note 9, wherein the feature value extractor extracts the feature values from the newly detected sound signal, the sound processing apparatus comprising an identification unit configured to identify the identification information corresponding to the feature values extracted from the new sound signal using the model.

(Supplementary Note 9.2)

The sound processing apparatus according to Supplementary Note 8 or 9, wherein the feature value extractor extracts the feature values from the newly detected sound signal, the sound processing apparatus comprising an identification unit configured to identify the sound signal based on the feature values extracted from the newly detected sound signal.

(Supplementary Note 10)

A program for implementing, in an information processing apparatus, a feature value extractor configured to perform a Fourier transform and then a cepstral analysis of a sound signal and to extract, as feature values of the sound signal, values including frequency components obtained by the Fourier transform of the sound signal and a value based on a result obtained by the cepstral analysis of the sound signal.

(Supplementary Note 10.1)

The program according to Supplementary Note 10, wherein the program further implements, in the information processing apparatus, a learning unit configured to generate a model by learning the sound signal based on the feature values extracted from the sound signal and identification information identifying the sound signal.

(Supplementary Note 10.2)

The program according to Supplementary Note 10.1, wherein the feature value extractor extracts the feature values from the newly detected sound signal, and the program further implements, in the information processing apparatus, an identification unit configured to identify the identification information corresponding to the feature values extracted from the new sound signal using the model.

(Supplementary Note 10.3)

The program according to Supplementary Note 10 or 10.1, wherein the feature value extractor extracts the feature values from the newly detected sound signal, and the program further implements, in the information processing apparatus, an identification unit configured to identify the sound signal based on the feature values extracted from the newly detected sound signal.

The above programs may be stored in various types of non-transitory computer-readable media and provided to a computer. The non-transitory computer-readable media include various types of tangible storage media. The non-transitory computer-readable media include, for example, a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, a semiconductor memory (for example, a mask ROM, a PROM (Programmable ROM), an EPROM (Erasable PROM), a flash ROM, a RAM (Random Access Memory)). The programs may be provided to a computer by using various types of transitory computer-readable media. The transitory computer-readable media include, for example, an electric signal, an optical signal, and an electromagnetic wave. The transitory computer-readable media can provide the programs to a computer via a wired communication channel such as an electric wire and an optical fiber or via a wireless communication channel.

While the present invention has been described with reference to the example embodiments and so on, the present invention is not limited to the example embodiments described above. The configurations and details of the present invention can be changed in various manners that can be understood by one skilled in the art within the scope of the present invention.

The present invention is based upon and claims the benefit of priority from Japanese Patent Application 2019-042431 filed on Mar. 8, 2019 in Japan, the disclosure of which is incorporated herein in its entirety by reference.

DESCRIPTION OF NUMERALS

1 signal processor
2 microphone
3 A/D converter
4 noise cancelation unit
5 FFT unit
6 MFCC unit
7 differentiator
8 learning unit
9 model storage unit
10 determination unit
20 feature value extractor
100 sound processing apparatus
101 CPU
102 ROM
103 RAM
104 programs
105 storage unit
106 drive unit
107 communication interface
108 input/output interface
109 bus
110 storage medium
111 communication network
121 feature value extractor

What is claimed is:

1. A sound processing method performed by a computer and comprising:

performing a Fourier transform and then a cepstral analysis of a sound signal; and extracting, as feature values of the sound signal, values including frequency components obtained by the Fourier transform of the sound signal, a zero-th-order component of a result obtained by the cepstral analysis of the sound signal, and a differential component of the result obtained by the cepstral analysis of the sound signal.

2. The sound processing method according to claim 1, wherein the cepstral analysis is a mel-frequency cepstral coefficient analysis.

3. The sound processing method according to claim 1, wherein a model is generated by learning the sound signal based on the feature values extracted from the sound signal and identification information identifying the sound signal.

4. The sound processing method according to claim 3, wherein the feature values are extracted from a newly detected sound signal, and the identification information corresponding to the feature values extracted from the newly detected sound signal is identified using the model.

5. The sound processing method according to claim 1, wherein the feature values are extracted from a newly detected sound signal, and the sound signal is identified based on the feature values.

6. A sound processing apparatus comprising:

a memory storing processing instructions; and at least one processor configured to execute the processing instructions, the processing instructions comprising:

performing a Fourier transform and then a cepstral analysis of a sound signal; and extracting, as feature values of the sound signal, values including frequency components obtained by the Fourier transform of the sound signal, a zero-th-order component of a result obtained by the cepstral analysis of the sound signal, and a differential component of the result obtained by the cepstral analysis of the sound signal.

7. The sound processing apparatus according to claim 6, wherein the cepstral-analysis is a mel-frequency cepstral coefficient analysis.

8. The sound processing apparatus according to claim 6, wherein the processing instructions comprise generating a model by learning the sound signal based on the feature values extracted from the sound signal and identification information identifying the sound signal.

9. The sound processing apparatus according to claim 8, wherein the processing instructions comprise extracting the feature values from a newly detected sound signal and identifying the identification information corresponding to the feature values extracted from the newly detected sound signal using the model.

10. The sound processing apparatus according to claim 6, wherein the processing instructions comprise extracting the feature values from a newly detected sound signal and identifying the sound signal based on the feature values extracted from the newly detected sound signal.

11. A non-transitory computer-readable storage medium storing a program for causing an information processing apparatus to perform a process comprising:

performing a Fourier transform and then a cepstral analysis of a sound signal; and extracting, as feature values of the sound signal, values including frequency components obtained by the Fourier transform of the sound signal, a zero-th-order component of a result obtained by the cepstral analysis of the sound signal, and a differential component of the result obtained by the cepstral analysis of the sound signal.

12. The non-transitory computer-readable storage medium storing the program according to claim 11, wherein the program causes the information processing apparatus to perform a process of generating a model by learning the sound signal based on the feature values extracted from the sound signal and identification information identifying the sound signal.

13. The non-transitory computer-readable storage medium storing the program according to claim 12, wherein the program causes the information processing apparatus to perform a process of extracting the feature values from a newly detected sound signal and identifying the identification information corresponding to the feature values extracted from the newly detected sound signal using the model.

14. The non-transitory computer-readable storage medium storing the program according to claim 11, wherein the program causes the information processing apparatus to perform a process of extracting the feature values from the newly detected sound signal and identifying the sound signal based on the feature values extracted from a newly detected sound signal.

15. The sound processing method according to claim 1, wherein the frequency components, the zero-th-order component, and the differential component are expressed as a set of numerical sequences in a time-series manner, and are used as the feature values.

16. The sound processing apparatus according to claim 6, wherein the frequency components, the zero-th-order component, and the differential component are expressed as a set of numerical sequences in a time-series manner, and are used as the feature values.

17. The non-transitory computer-readable storage medium storing the program according to claim 11, wherein the frequency components, the zero-th-order component, and the differential component are expressed as a set of numerical sequences in a time-series manner, and are used as the feature values.

* * * * *